United States Patent [19]

Shorr et al.

[11] 4,098,594

[45] Jul. 4, 1978

[54] INERTIAL PARTICLE SEPARATOR

[75] Inventors: Morton Shorr; George Rudinger, both of Williamsville, N.Y.

[73] Assignee: Textron Inc., Providence, R.I.

[21] Appl. No.: 750,362

[22] Filed: Dec. 13, 1976

[51] Int. Cl.² ............................................. B01D 45/04
[52] U.S. Cl. ...................................... 55/403; 55/407; 55/423; 55/431; 55/443
[58] Field of Search .................................. 55/400–409, 55/423, 431, 437, 443, 445, 434, 466

[56] References Cited

U.S. PATENT DOCUMENTS

| | | | |
|---|---|---|---|
| 1,311,573 | 7/1919 | Newburgh | 55/423 |
| 1,511,834 | 10/1924 | Marien | 55/407 X |
| 2,431,336 | 11/1947 | Lincoln | 55/409 X |
| 2,780,309 | 2/1957 | Loftheim | 55/407 |
| 3,720,045 | 3/1973 | Murphy | 55/407 X |

FOREIGN PATENT DOCUMENTS 44,377 9/1887 Fed. Rep. of Germany ......... 55/403

Primary Examiner—Frank W. Lutter
Assistant Examiner—Kathleen J. Prunner
Attorney, Agent, or Firm—Bean, Kauffman & Bean

[57] ABSTRACT

A low velocity, low temperature, inertial particle separator is disclosed which imposes minimum resistance to the flow of gas through the apparatus. The separator includes a slowly revolving drum with radiating cups around which the gas must flow. Change of direction of the flowing gas as it flows around the cups causes the entrained particles to be collected by the cup-shape of the cups. A vacuum system is provided for inducing the collected particles to migrate to a central axially disposed collection system which draws the particles away by suction.

11 Claims, 8 Drawing Figures

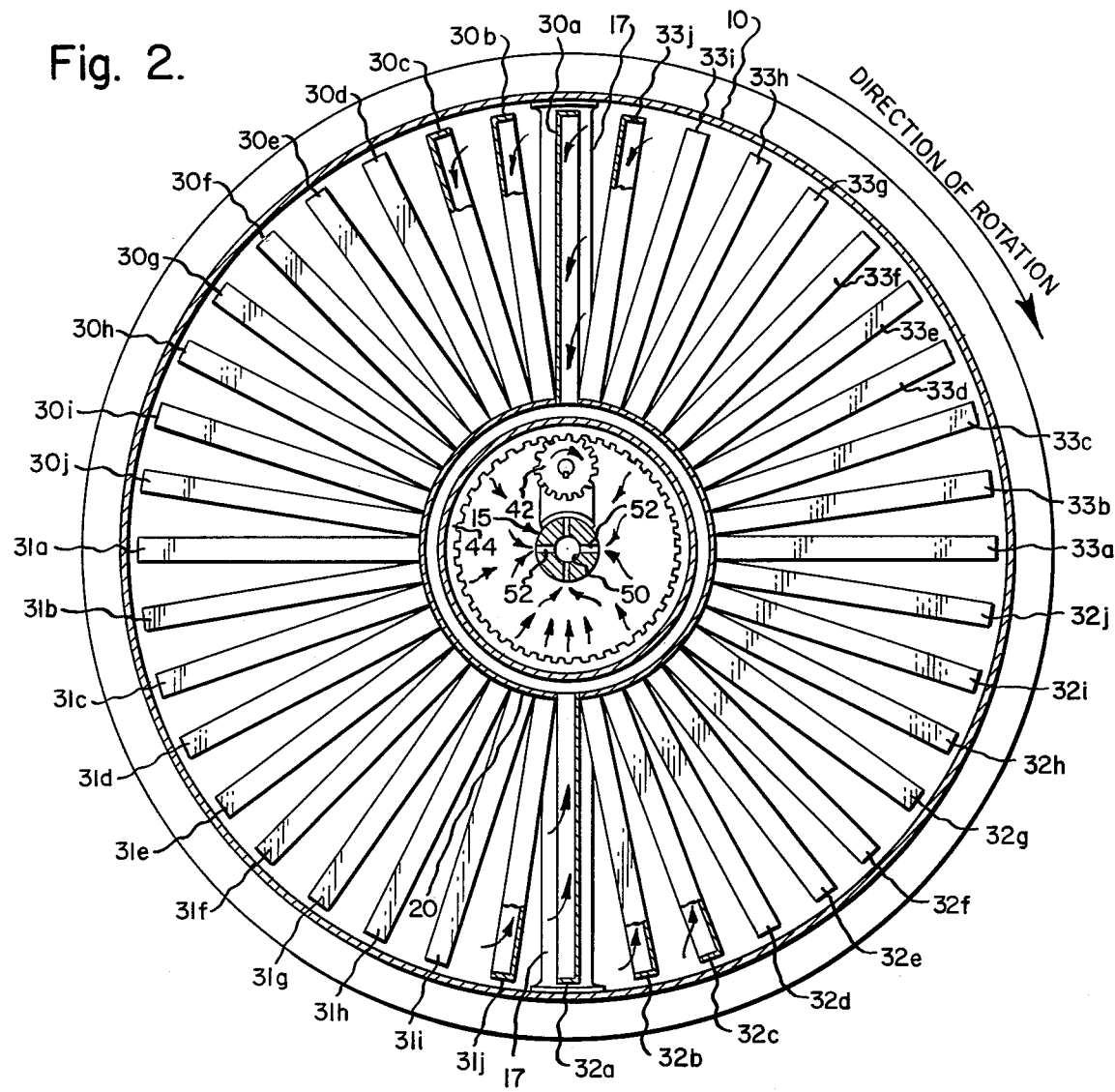

Fig. 4.
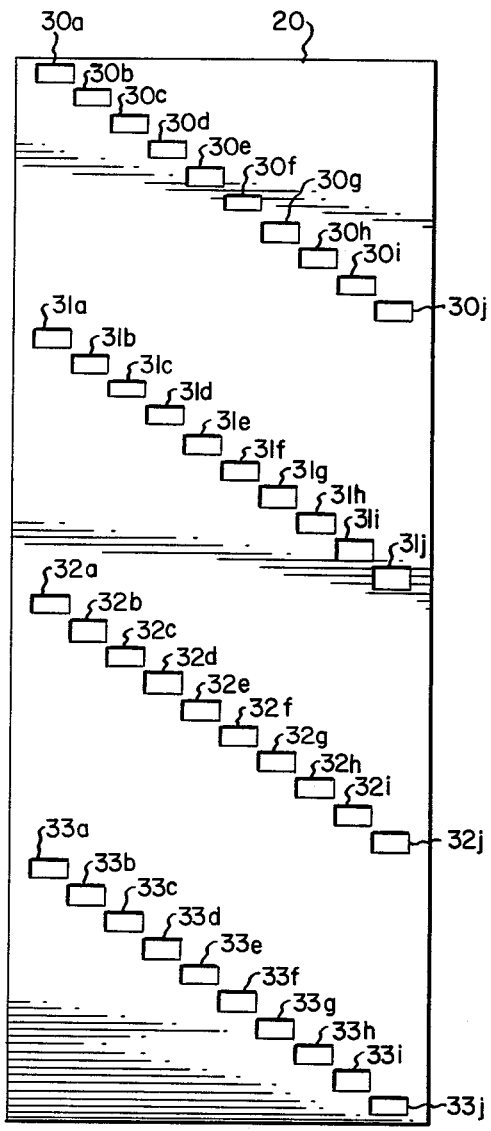
Fig. 5
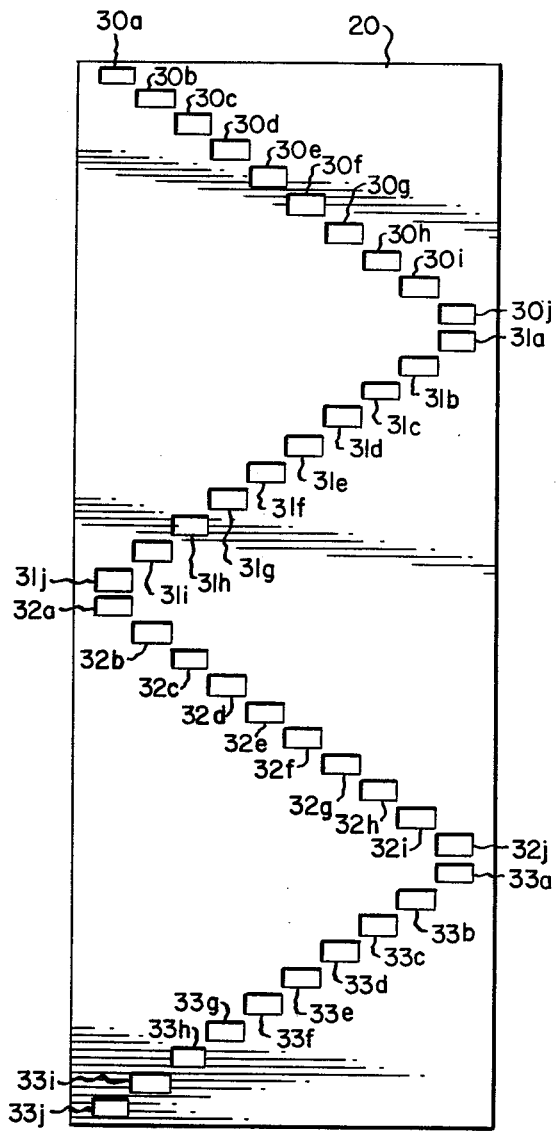
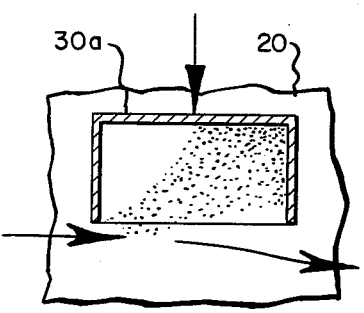
Fig. 6.
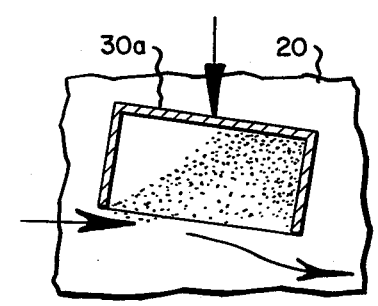
Fig. 7.
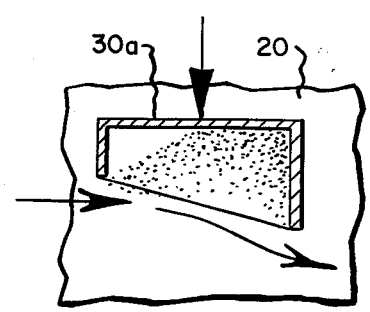
Fig. 8.

INERTIAL PARTICLE SEPARATOR

BACKGROUND AND OBJECTS OF THE INVENTION

Various devices have been previously suggested for this purpose such as employ stationary deflectors for causing abrupt changes in the direction of gas flow, or mechanisms for spinning the gas and centrifugally removing the undesired particles. Prior patents known to be relevant to separating techniques such as referred to include, for example, U.S. Pat. Nos. 492,081; 2,431,336; 2,648,398; 3,293,832; 3,725,271; 3,908,367; and 3,912,464.

The primary object of the present invention is to provide an improved low velocity/low temperature type inertial particle separator whereby improved pollutant removal efficiencies may be obtained.

Another object of the invention is to provide an improved gas/pollutant separator which is economical to operate and which imposes minimum added resistance to flow of the input gas stream through the apparatus.

THE DRAWING

The invention is illustrated by way of example in the accompanying drawing, wherein:

FIG. 2 is a transverse section taken as suggested by line 2—2 of FIG. 1;

FIG. 3 is a fragmentary enlarged scale sectional view taken as suggested by line 3—3 of FIG. 1;

FIGS. 4 and 5 are schematic rolled-out illustrations of a rotor drum wall portion of the apparatus showing alternative forms of particle interception arrangements such as may be employed in accordance with the invention;

FIG. 6 is an enlarged scale fragmentary sectional view taken as shown on FIG. 1; and FIGS. 7 and 8 are views corresponding to FIG. 6 showing alternative types and arrangements of separating components of the apparatus.

Figure 1:
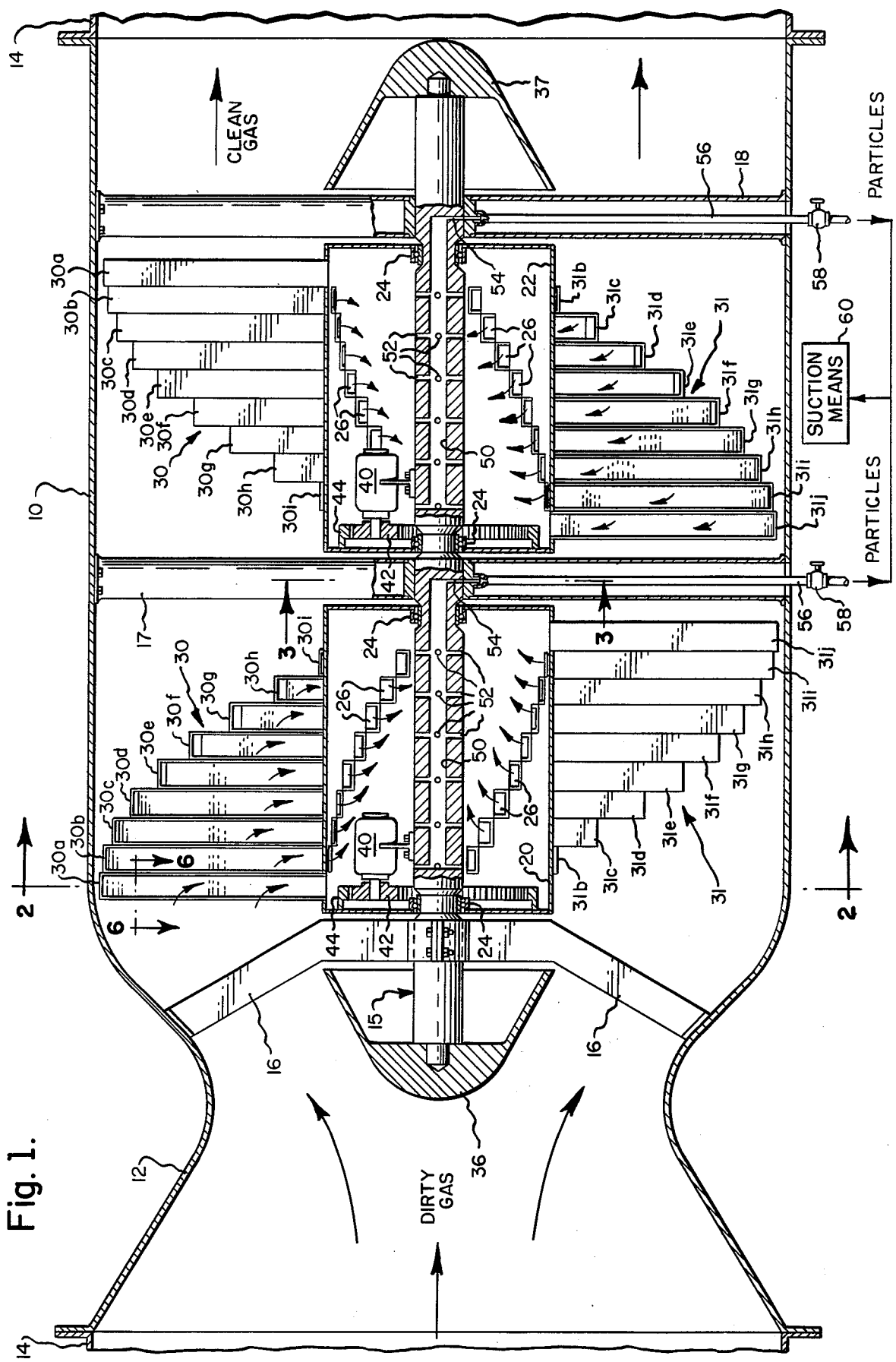
FIG. 1 is a longitudinal sectional view through an examplary form of separator of the present invention.

As illustrated herewith, the invention may be embodied in an apparatus comprising an outer casing 10 which is of generally tubular form having at its polluted gas inlet end a preferably venturi-shaped inlet section 12, while being completely open-ended at its gas discharge end section 14. A rotor is carried interiorly of the casing as by means of an axle 15 which is stationarily mounted to longitudinally extend centrally of the interior of the casing 10, as by means of support arms 16, 17, 18.

As shown by way of example at FIG. 1, the rotor may comprise a pair of drums 20 and 22 respectively which are rotatably mounted on the axle 15 as by means of bearings 24. However, it is to be understood that the "rotor" may comprise only one, or any other number of drums in series. As shown herein the drums 20 and 22 respectively are of cylindrical form and are closed at their opposite ends while being multiple-apertured through their peripheral wall portions as indicated at 26 for fluid flow intercommunication with channel-shaped particle collecting cups which will be described in more detail hereinafter. Said cups extend radially from each drum and are "grouped" in specific arrangements as will also be more fully explained hereinafter; the cups of each group being respectively designated herein by the basic numerals 30-31-32-33 and correspondingly lettered sub-numerals *a, b, c,* etc. on the drawing herewith.

Nose and tail cones such as are shown at 36–37 may be mounted on opposite ends of the axle 15 to streamline the flow of gas through the casing and around the "hub" of the rotor mechanism for increased operational efficiency.

In any case the particle intercepting cups are of elongate channel-sectioned form, and are fixedly attached as radially extending blades to the drums so as to fan out from their connections to the drums so as to substantially occupy the otherwise open space between the drums and the casing 10 as shown in FIG. 2. The cups are of course lengthwise dimensioned so as to permit free operation of the rotor about the axle 15 inside of the casing 10 and are closed at their outer ends, and are disposed with their open sides facing the direction of their rotation, also as best shown at FIG. 2.

In the example shown herein at FIG. 1 (and at FIG. 4 which is a schematic illustration), the cups are mounted on the drums in groups of 10; each successive cup member of each group being attached in open communication at its inner end through means of the perforations 26 with the interior of the drum, at stations retreating longitudinally of the drum. Also note that in the example shown, each group of cups occupies only one-fourth of the end view of the otherwise open space within the casing 10; whereby four such groups of cups complete the end view occupation of said space between the drum and the casing. However, it is to be understood that any other number of cups may be provided to constitute a "group" of cups, and that any other preferred number of "groups" may be provided to occupy the end view otherwise open space within the casing, as contemplated herein. For example, FIG. 5 illustrates in comparison with FIG. 4 an alternative schematic arrangement of drum perforations and interconnecting particle intercepting cups of the invention.

In any case the cups are arranged in the manner of blades extending radially from the drums as viewed in FIG. 2, whereby those portions of the incoming gas stream which impact directly against the side walls of the cups which face against the oncoming gas stream are deflected to flow around each cup and thence at increased velocities between the restricted spaces between successive cups, in accordance with the well known "Venturi effect". Incidental to such flowing at increased velocities of portions of the gas stream around the cups the pollutant particles in the gas stream are diverted into the cups for disposal, as will also be explained more fully hereinafter.

These particle diversionary effects may be variously regulated by mounting the cups so as to extend from the drums in any preferred "square-on" or canted or "feathered" attitude about the longitudinal axis of the cup as shown by comparison of FIGS. 6, 7, herewith. The use of such feathering and/or the degree thereof will depend upon parameters such as nature of the input gas stream approach velocity of the input gas stream; sizing and relative dispositionings of the cups; speed of rotation of the cups; and the desired performance of the machine. Or, it may be preferred to sectionally configure the cups as shown at FIG. 8. In any case the dimensionings of the cup structures and of the relative spacings therebetween (both in side view and end view as shown in FIGS. 1, 2) will also depend upon the parameters mentioned above.

The rotor section(s) of the machine may of course be driven by any suitable means. For example, an electric motor as shown at 40 in FIG. 1 mounted on the axle 15 interiorly of the drum may be arranged to drive the latter through means of a spur gear 42 and a ring gear 44 carried by the rotor. If the machine includes a plurality of such drums as shown in FIG. 1, the train of drums may be coupled together so that a single motor will drive the train; or alternatively, the drums may be driven by means of separate motors as shown in FIG. 1. In the latter case the drums may be driven to rotate about the axle 15 either in the same direction or in opposite directions; and at similar speeds, or at different speeds.

The pollutant particle disposal system, as shown in FIGS. 1, 2 and 3, comprises bore 50 formed in axle 15 in the region of drums 20 and 22, and a plurality of inlet openings 52 formed through the wall of the axle 15 to join bore 50. Openings 52 are located so that solid particles sliding from the cups into the interior of drums 20 and 22 find their way to bore 50. Bore 50 of the axle is connected in open communication with an outlet channel 54 which connects to an entrapped particle discharge tube 56. Tube 56 is coupled in turn into connection with a suction source or vacuum pump 60, under operational control of a valve such as indicated at 58.

Thus, it will be appreciated that as the rotor of the machine revolves the cups thereof intercept portions of the incoming gas stream at right angles to the normal flow direction thereof, and directionally divert them; successively encountered cups of the machine thereby providing means for eventually intercepting all portions of the gas stream while at no time forming a barrier to free flow of the gas stream through the machine.

The "vacuum" condition interiorly of the drum(s) extends out through the cups and as each cup obstructs its portion of the by-passing gas stream it directionally diverts the encountered portion of the gas stream so that particles entrained therein are drawn thereinto and are caught against the closed rear wall of the cup; and are thereupon induced to slide radially inwardly therealong and thence through the inlet openings 52 into the open bore(s) 50 of the axle. The ambient pressure differential between the interior of the casing 10 and the bore(s) 50 of the axle causes the entrapped solid particles to thereupon travel on out through the tube(s) 56, for final disposal in whatever fashion may be preferred.

It should be noted that in the case of the present invention the rotor is driven at low speed, for example within the range of 100–1000 RPM; sufficient only to insure uniform interceptions of pollutant particles of all increments of the incoming gas stream. Hence, no centrifugal forces are induced such as would restrain travel of the captured particulate matters into the interior of the drum and thence to the discharge.

I claim:

1. An apparatus for separation of pollutants such as dust or other solid or liquid particles from air and other gases, comprising a stationary cylindrical housing having a polluted gas inlet at one end and a cleaned gas discharge at its other end, a rotary separating member situated in said housing for rotation in one rotational direction and having its axis of rotation coincident with the longitudinal axis of said housing and means operatively connected to said separating member for causing said member to rotate in said one rotational direction, said separating member including a stationary axle mounted within said housing, a drum with a cylindrical wall portion and opposite end portions rotatably mounted on said axle, a plurality of elongate cups fixed to said drum to extend radially therefrom, said cups each comprising a channel having a U-shaped cross-section opening in said one rotational direction, said cups being arranged as to define between themselves restricted passageways for particle laden gases to flow from said inlet towards said discharge, said drum being perforated through the cylindrical wall portion thereof in fluid flow communication with said cups at their fixed connections with said drum, said axle being centrally bored and having apertures formed through the wall thereof intercommunicating interiors of said drum and said axle, a particle disposal conduit arranged in open communication with said bore, whereby pollutant particles entrapped within said cups may slide thereon into and through said drum and said apertures and through the bore of said axle into said disposal conduit, and suction means operatively coupled with said conduit to induce travel of intercepted pollutant particles radially inwardly and through the interior of said drum and of said bore of said axle and thence out through said disposal conduit.

2. An apparatus as set forth in claim 1, wherein said cups are arranged to extend radially from said drum in sequence at locations extending diagonally relative to the said axis of rotation.

3. An apparatus as set forth in claim 2, wherein said cups are arranged in groups, each group thereof occupying only part of the end view open space between said drum and said housing.

4. An apparatus as set forth in claim 3, wherein said cups are arranged in groups, each group thereof occupying only part of the end view open space between said drum and said housing, said groups being so arranged as to complement each other so as to substantially occupy the entire end view open space between said drum and said housing.

5. An apparatus as set forth in claim 1, wherein said separating member includes a plurality of drums rotatably mounted within said housing in series longitudinally thereof.

6. An apparatus as set forth in claim 5, wherein said drums are driven to rotate in the same direction and at the same speed.

7. An apparatus as set forth in claim 5, wherein at least one of said drums is driven to rotate in a direction opposite to the direction of rotation of at least one of the other drums.

8. An apparatus as set forth in claim 7, wherein at least one of said drums is driven to rotate at a speed greater than the speed of rotation of at least one of the other of said drums.

9. An apparatus as set forth in claim 5, wherein at least one of said drums is driven to rotate at a speed greater than the speed of rotation of at least one of the other drums.

10. An apparatus as set forth in claim 1, wherein said cups are diagonally canted about their radially extending axes.

11. An apparatus as set forth in claim 1, wherein said cups are of unequal side wall dimensions.

* * * * *